United States Patent
Bennett et al.

(10) Patent No.: US 8,848,759 B1
(45) Date of Patent: Sep. 30, 2014

(54) POWER SCALING OF ER:YAG LASER WITH 9XX NM PUMPING

(75) Inventors: Glenn Bennett, Boulder, CO (US); Tiffanie G. D'Alberto, Brighton, CO (US); Larry Rubin, Lafayette, CO (US); Junith Rubin, legal representative, Lafayette, CO (US); Robert Stoneman, Lafayette, CO (US); Ross Mackes, Westminster, CO (US); Munib Jalali, Lafayette, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 634 days.

(21) Appl. No.: 13/074,682

(22) Filed: Mar. 29, 2011

(51) Int. Cl.
H01S 3/091 (2006.01)

(52) U.S. Cl.
USPC .......................................................... 372/70

(58) Field of Classification Search
CPC ..... H01S 3/164; H01S 3/1608; H01S 3/1691; H01S 3/1643
USPC ....................................................... 372/70, 20
See application file for complete search history.

(56) References Cited

U.S. PATENT DOCUMENTS

| 4,995,046 | A | * | 2/1991 | Fan et al. | 372/41 |
| 2003/0138021 | A1 | * | 7/2003 | Hodgson et al. | 372/75 |
| 2004/0218652 | A1 | * | 11/2004 | Spariosu et al. | 372/70 |
| 2006/0182162 | A1 | * | 8/2006 | Yanagisawa et al. | 372/70 |

\* cited by examiner

Primary Examiner — Tuan Nguyen
(74) Attorney, Agent, or Firm — Fraser Clemens Martin & Miller LLC; J. Douglas Miller

(57) ABSTRACT

An optical system includes a waveguide having a guiding core formed from erbium-doped yttrium aluminum garnet and a plurality of first cladding layers, wherein at least two of the first cladding layers are disposed adjacent opposite sides of the guiding core and a pump source for generating an electromagnetic radiation having a wavelength in the range of 900 to 1000 nanometers, wherein the pump source directs the electromagnetic radiation into at least the guiding core to pump the guiding core into an upper state.

14 Claims, 1 Drawing Sheet

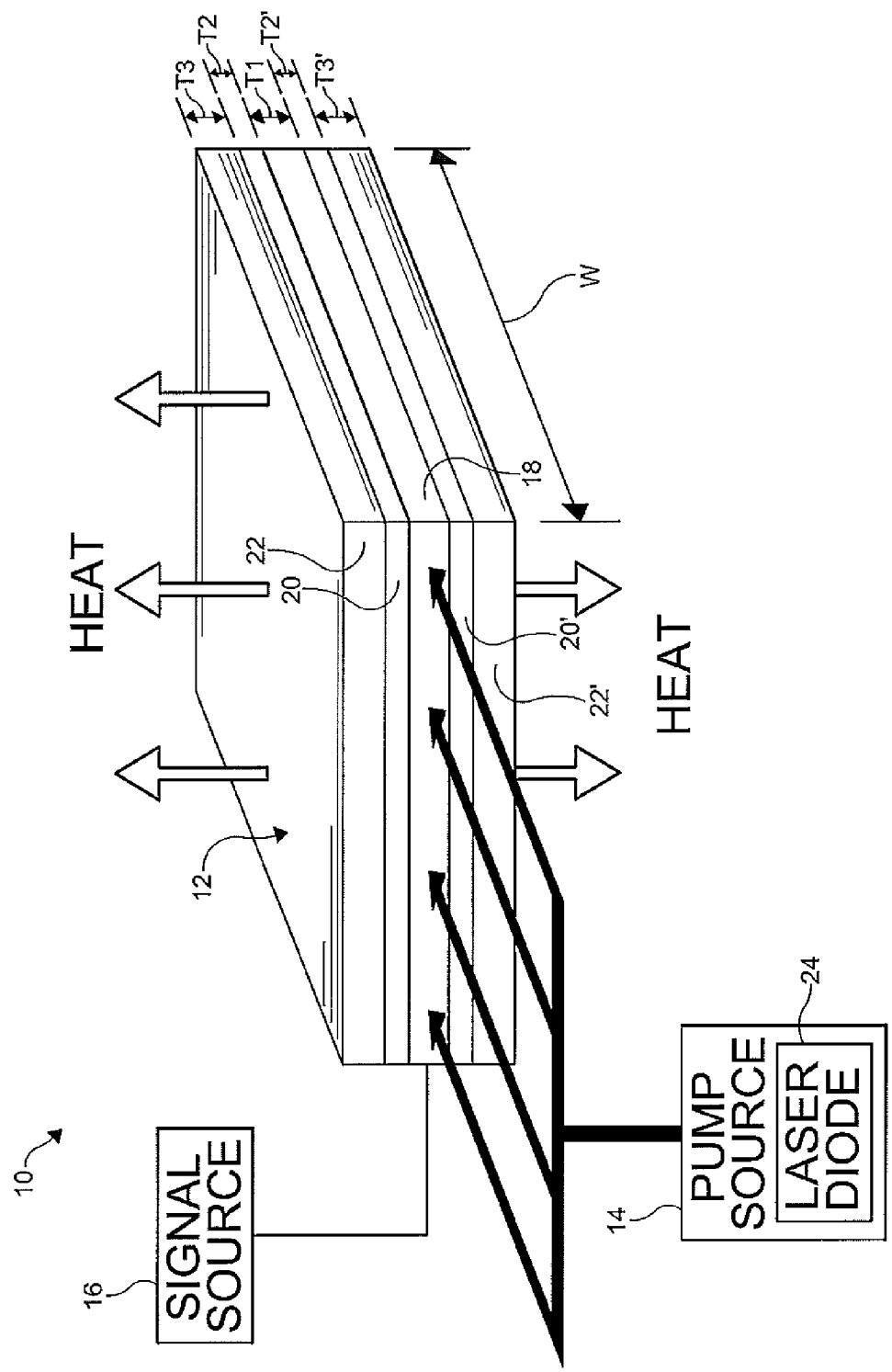

POWER SCALING OF ER:YAG LASER WITH 9XX NM PUMPING

STATEMENT REGARDING FEDERALLY SPONSORED RESEARCH OR DEVELOPMENT

Not applicable.

FIELD OF THE INVENTION

The present invention relates to power scaling of lasers. In particular, the present invention is directed to a system and a method for power scaling of an erbium-doped yttrium aluminum garnet (Er:YAG) laser.

BACKGROUND OF THE INVENTION

There is an increased interest in power-scaling eye-safe technologies to the 100 Watt (W) class level. Fiber lasers, though relatively inexpensive and compact, are limited in energy and power scaling at narrow line widths from competing non-linear processes. Bulk solid-state solutions, which have large enough mode area to ignore non-linear effects, have focused on pumping at around 1400-1500 nm, where erbium-doped yttrium aluminum garnet (Er:YAG) absorption is high. The in-band pumping offers several advantages in that the quantum defect is low and there are few competing up-conversion processes. However, the high absorption limits power scaling due to thermal limitations and short gain lengths. The diode technology at these wavelengths is also less mature than at 9xx nm.

Currently, devices achieving approximately 100 W pulsed eye-safe wavelengths are restricted to in-band pumping of bulk slabs of Er:YAG. Limitations to the conventional bulk slab pumping approach include thermal handling, thermal lensing, short pump-signal interaction lengths, high upconversion levels owing to high inversions and high gain, and poor efficiency pump sources.

Another approach has been side pumping of Er:Yb:YAG in the 900 nm band where the Yb co-dopant is excited and energy is transferred to the Er species. However, the high absorption of the Yb causes similar problems as with in-band pumping of Er:YAG. Fiber lasers can achieve high power in continuous wave operation, but are severely limited in pulsed operation at narrow line widths. Beam combination can help the fiber laser solution at the cost of beam quality.

It is desirable to develop an optical system and a method for power scaling a laser to greater than 100 W, wherein the system and the method provide a compact design to manage thermal and non-linear considerations, while maximizing optical-to-optical and electrical-to-optical efficiencies.

SUMMARY OF THE INVENTION

Concordant and consistent with the present invention, an optical system and a method for power scaling a laser to greater than 100 W, wherein the system and the method provide a compact design to manage thermal and non-linear considerations, while maximizing optical-to-optical and electrical-to-optical efficiencies of converting a pump radiation energy into a signal energy, has surprisingly been discovered.

In one embodiment, an optical system comprised: a waveguide including a guiding core formed from erbium-doped yttrium aluminum garnet and a plurality of first cladding layers, wherein at least two of the first cladding layers are disposed adjacent opposite sides of the guiding core; and a pump source for generating an electromagnetic radiation having a wavelength in the range of 900 to 1000 nanometers, wherein the pump source directs the electromagnetic radiation into at least the guiding core to pump the guiding core into an upper state.

The invention also provides methods for power scaling a laser.

One method comprises the steps of: providing a waveguide including a guiding core and a plurality of first cladding layers, the guiding core having a width-to-thickness aspect ratio of at least three-to-one, wherein at least two of the first cladding layers are disposed on opposite sides of the guiding core; generating an electromagnetic radiation having a wavelength in the range of 900 to 1000 nanometers; transmitting the electromagnetic radiation into the guiding core of the waveguide to pump the guiding core into an upper state; and emitting an output waveform from the waveguide.

Another method comprises the steps of: providing a waveguide including a guiding core formed from erbium-doped yttrium aluminum garnet and a plurality of first cladding layers, wherein at least two of the first cladding layers are disposed adjacent opposite sides of the guiding core; generating an electromagnetic radiation having a wavelength in the range of 900 to 1000 nanometers; transmitting the electromagnetic radiation into the guiding core of the waveguide to pump the guiding core into an upper state; and emitting an output waveform from the waveguide having a power output of at least 100 Watts.

BRIEF DESCRIPTION OF THE DRAWINGS

The above, as well as other advantages of the present invention, will become readily apparent to those skilled in the art from the following detailed description of the preferred embodiment when considered in the light of the accompanying drawing which is a schematic representation of an optical system according to an embodiment of the present invention.

DETAILED DESCRIPTION OF THE INVENTION

The following detailed description and appended drawing describe and illustrate various embodiments of the invention. The description and drawing serve to enable one skilled in the art to make and use the invention, and are not intended to limit the scope of the invention in any manner. In respect of the methods disclosed, the steps presented are exemplary in nature, and thus, the order of the steps is not necessary or critical.

Referring to the Figure, there is illustrated an optical system 10 according to an embodiment of the present invention. As shown, the optical system 10 includes a waveguide 12, a pump source 14, and a signal source 16. It is understood that the optical system 10 does not require the signal source 16 when configured as an oscillator. It is further understood that additional components (e.g. heat sinks, optical devices, secondary waveguides, components to form a laser cavity, and the like) may be included without departing from the scope and spirit of the invention.

The waveguide 12 is typically a self-imaging waveguide including a guiding core 18, a pair of inner cladding layers 20, 20', and a pair of outer cladding layers 22, 22'.

The guiding core 18 is typically a lasing medium formed from erbium-doped yttrium aluminum garnet (i.e. Er:YAG). In certain embodiments, the guiding core 18 is minimally doped (e.g. less than 1.0% erbium). As a non-limiting example, the guiding core 18 has a dimensional aspect ratio of at least 2.4:1, wherein a width W (i.e. a first length) of the guiding core 18 is at least ten times a thickness T1 (i.e. height). It is understood that providing the guiding core 18 with an aspect ratio of at least about 2.4:1 (e.g. on a gain area) provides for efficient removal of heat and a nearly one dimensional heat flow across the pumped gain region that minimizes stress-optic effects. It is further understood that the aspect ratio of the guiding core 18 provides for sufficient overlap between pump and signal. As a further non-limiting example, the dimensions of the guiding core 18 are pre-determined (e.g. by experimentation, known behavior or particular dimensions, and other known techniques in the art) to achieve a very high non-linear threshold to minimize non-linear effects such as Self-Phase Modulation, Simulated Brillion Scattering, and the like, for example (even under single-longitudinal mode operation). Additionally, it is understood that a Talbot-like imaging of the guiding core 18 provides superior beam quality characteristics. In certain embodiments, the guiding core 18 includes a plurality of variable Bragg gratings (not shown) to provide a narrow absorption line. It is understood that the gratings can have any configuration as required for a particular application.

Each of the inner cladding layers 20, 20' (i.e. total internal reflection layers) is disposed adjacent opposite sides of the guiding core 18. In certain embodiments, the inner cladding layers 20, 20' are disposed on opposing surfaces of the guiding core 18 having the largest surface area to "sandwich" the guiding core 18 therebetween. As a non-limiting example, the inner cladding layers 20, 20' are formed from a material with a pre-determined index of refraction lower than that of the guiding core 18. In certain embodiments, a thickness T2, T2' of each of the inner cladding layers 20, 20' is substantially the same. In certain embodiments, the thickness T2, T2' of each of the inner cladding layers 20, 20' is less than the thickness T1 of the guiding core 18. However, other relative dimensional aspect ratios can be used.

In the embodiment shown, one of the outer cladding layers 22, 22' is disposed adjacent each of the inner cladding layers 20, 20' and spaced from the guiding core 18. As a non-limiting example, the inner cladding layers 20, 20' are formed from a material (e.g. un-doped YAG, sapphire, Magnesium Fluoride, and the like) with a pre-determined index of refraction lower than that of the inner cladding layers 20, 20' and the guiding core 18. In certain embodiments, a thickness T3, T3' of each of the outer cladding layers 22, 22' is substantially the same. In certain embodiments, the thickness T3, T3' of each of the outer cladding layers 22, 22' is greater than the thickness T2, T2' of each of the inner cladding layers 20, 20'. However, other relative dimensional aspect ratios can be used. In certain embodiments, the waveguide 12 is a single-clad waveguide and the outer cladding layers 22, 22' abut opposite sides of the guiding core 18.

The pump source 14 typically includes at least one laser diode 24 configured to emit an electromagnetic radiation having a pre-determined wavelength. As a non-limiting example, the at least one laser diode 24 is configured to emit electromagnetic radiation having a wavelength in the 900 to 1000 nm range. However, other bands can be generated. It is understood that unlike solutions that require in-band pumping in a wavelength band of 1400 to 1500 nm, pumping in the 900 to 1000 nm band allows for lower absorption, lower thermal load per area, and therefore longer gain regions. In turn, longer gain regions allow for lower gain and lower inversions which reduce competing upconversion effects and add to an overall optical efficiency. The 900 to 1000 nm laser diode 24 provides twice the brightness and twice the power per bar compared to higher wavelength counterparts, thereby allowing for efficient coupling to the core and high optical-to-optical efficiency. Also, the 900 to 1000 nm wavelength band is well within the high efficiency upgrades offered by the laser diode industry, thereby maximizing an electrical-to-optical efficiency of the pump operation.

In certain embodiments, the signal source 16 transmits an electromagnetic input signal into the waveguide 12, wherein the pumping of the waveguide 12 results in an amplification of the input signal. It is understood that any signal source can be used such as an oscillator, a laser source, and another waveguide. It is further understood that the waveguide 12 can be configured as an oscillator, wherein the signal source 16 is not required. Accordingly, the input signal directed into the guiding core 18 reemerges at a higher power (i.e. amplifier mode). Alternatively, the waveguide 12 can be configured as part of a laser resonator, wherein a fluorescence is amplified to produce a laser output (i.e oscillator mode).

In use, the pump source 14 emits electromagnetic radiation into the waveguide 12 to "pump" the guiding core 18 to an upper state. As a non-limiting example, the electromagnetic radiation emitted from the pump source 14 has a wavelength in the 900 to 1000 nm band. It is understood that an electromagnetic radiation having a wavelength in the 900 to 1000 band has a lower absorption into the guiding core 18. Accordingly, a thermal loading on the guiding core 18 is minimized, which allows for maximized interaction length between pump (i.e. the electromagnetic radiation emitted into the waveguide 12 from the pump source 14) and signal (e.g. the input signal from the signal source 16 or reflective signal in the laser cavity). The waveguide 12 can be pumped to generate a pulsed waveform having an output power of at least 100 W (e.g. at narrow line widths, with greater than 25% optical-to-optical efficiency).

The optical system 10 of the present invention manages the thermal loads, upconversion processes, and non-linear effects, while providing superior beam quality. The increased gain length (due to the lower absorption effects from the 900 to 1000 nm band pump source 14) provides for efficient pumping with reduced upconversion effects and temperature stable operation of pulsed waveforms having scaling potential to over 1 kW. The waveguide 12 coupled with a 900 to 1000 nm pumping scheme provides for an overall compact design with over 25% optical-to-optical efficiency.

While certain representative embodiments and details have been shown for purposes of illustrating the invention, it will be apparent to those skilled in the art that various changes may be made without departing from the scope of the disclosure, which is further described in the following appended claims.

What is claimed is:

1. An optical system comprising:
   a waveguide including a guiding core formed from erbium-doped yttrium aluminum garnet and a plurality of first cladding layers, wherein the guiding core has a width-to-thickness aspect ratio of at least about 2.4 to 1, wherein at least two of the first cladding layers are disposed adjacent opposite sides of the guiding core and wherein a doping percentage of the guiding core is less than one percent; and
   a pump source for generating an electromagnetic radiation having a wavelength in the range of 900 to 1000 nanometers, wherein the pump source directs the electromagnetic radiation into at least the guiding core to pump the guiding core into an upper state to produce an output waveform that is an eye-safe radiation.

2. The system according to claim 1, wherein an index of refraction of each of the first cladding layers is less than an index of refraction of the guiding core.

3. The system according to claim 1, further comprising a plurality of second cladding layers, wherein each of the second cladding layers is spaced from the guiding core and abuts a surface of one of the first cladding layers.

4. The system according to claim 3, wherein an index of refraction of each of the second cladding layers is less than an index of refraction of at least one of the guiding core and each of the first cladding layers.

5. The system according to claim 1, wherein the pump source includes at least one laser diode capable of emitting the electromagnetic radiation in the range of 900 to 1000 nanometers.

6. A method for power scaling a laser, the method comprising the steps of:
  providing a waveguide including a guiding core and a plurality of first cladding layers, the guiding core having a width-to-thickness aspect ratio of at least 2.4 to 1 and a doping percentage of less than one percent, wherein at least two of the first cladding layers are disposed on opposite sides of the guiding core;
  generating an electromagnetic radiation having a wavelength in the range of 900 to 1000 nanometers;
  transmitting the electromagnetic radiation into the guiding core of the waveguide to pump the guiding core into an upper state; and
  emitting an output waveform from the waveguide that is an eye-safe radiation.

7. The method according to claim 6, wherein the guiding core is formed from erbium-doped yttrium aluminum garnet.

8. The method according to claim 6, wherein an index of refraction of each of the first cladding layers is less than an index of refraction of the guiding core.

9. The method according to claim 6, further comprising a plurality of second cladding layers, wherein each of the second cladding layers is spaced from the guiding core and abuts a surface of one of the first cladding layers.

10. The method according to claim 9, wherein an index of refraction of each of the second cladding layers is less than an index of refraction of at least one of the guiding core and each of the first cladding layers.

11. The method according to claim 6, wherein the output waveform is a pulsed waveform.

12. The method according to claim 6, wherein an output power of the output waveform is at least 100 W.

13. A method for power scaling a laser, the method comprising the steps of:
  providing a waveguide including a guiding core formed from erbium-doped yttrium aluminum garnet and a plurality of first cladding layers, wherein the guiding core has a width-to-thickness aspect ratio of at least about 2.4 to 1, wherein at least two of the first cladding layers are disposed adjacent opposite sides of the guiding core and wherein a doping percentage of the guiding core is less than one percent;
  generating an electromagnetic radiation having a wavelength in the range of 900 to 1000 nanometers;
  transmitting the electromagnetic radiation into the guiding core of the waveguide to pump the guiding core into an upper state; and
  emitting an output waveform from the waveguide having a power output of at least 100 Watts, wherein the output waveform is an eye-safe radiation.

14. The method according to claim 13, further comprising a plurality of second cladding layers, wherein each of the second cladding layers is spaced from the guiding core and abuts a surface of one of the first cladding layers.

* * * * *